United States Patent
Daetz et al.

(10) Patent No.: US 11,710,133 B2
(45) Date of Patent: Jul. 25, 2023

(54) MULTI-NETWORK TOKENIZATION SYSTEMS AND METHODS

(71) Applicant: MASTERCARD INTERNATIONAL INCORPORATED, Purchase, NY (US)

(72) Inventors: Marthom Daetz, O'Fallon, MO (US); Nicholas Marchesi, O'Fallon, MO (US); Devon Santagato, Ballwin, MO (US)

(73) Assignee: Mastercard International Incorporated, Purchase, NY (US)

( * ) Notice: Subject to any disclaimer, the term of this patent is extended or adjusted under 35 U.S.C. 154(b) by 66 days.

(21) Appl. No.: 17/138,460

(22) Filed: Dec. 30, 2020

(65) Prior Publication Data
US 2022/0207532 A1    Jun. 30, 2022

(51) Int. Cl.
*G06Q 20/40*    (2012.01)
*H04L 69/08*    (2022.01)
*G06Q 20/08*    (2012.01)
*G06Q 40/02*    (2023.01)
*G06Q 20/02*    (2012.01)
*G06Q 20/38*    (2012.01)

(52) U.S. Cl.
CPC .......... *G06Q 20/405* (2013.01); *G06Q 20/02* (2013.01); *G06Q 20/085* (2013.01); *G06Q 20/385* (2013.01); *G06Q 40/02* (2013.01); *H04L 69/08* (2013.01)

(58) Field of Classification Search
None
See application file for complete search history.

(56) References Cited

U.S. PATENT DOCUMENTS

| | | |
|---|---|---|
| 6,163,771 A | 12/2000 | Walker et al. |
| 6,678,664 B1 | 1/2004 | Ganesan |
| 7,363,265 B2 | 4/2008 | Horgan |

(Continued)

OTHER PUBLICATIONS

G. Me, M. A. Strangio and A. Schuster, "Mobile Local Macropayments: Security and Prototyping," in IEEE Pervasive Computing, vol. 5, No. 4, pp. 94-100, Oct.-Dec. 2006, doi: 10.1109/MPRV.2006.78. (Year: 2006).*

(Continued)

*Primary Examiner* — Gregory S Cunningham, II
(74) *Attorney, Agent, or Firm* — Armstrong Teasdale LLP

(57) ABSTRACT

A computing system for electronically managing a token across multiple computer networks is described. The computing system includes a processor in communication with at least one memory device. The processor is programmed to generate a token associated with a payment account, the token having a format that simulates a format of a checking account identifier, and receive a payment request including the token, the payment request processed over a first network. The processor is also programmed to apply a set of rules to the payment request, determine that the payment request satisfies the set of rules, and convert the token into a payment account identifier using the set of rules. The processor is further programmed to transmit an authorization request message to a second network, receive authorization of the authorization request message from the second network, and provide authorization of the payment request to the first network.

20 Claims, 8 Drawing Sheets

(56) References Cited

U.S. PATENT DOCUMENTS

| | | |
|---|---|---|
| 8,266,058 B1 | 9/2012 | Anderson |
| 8,788,429 B2 | 7/2014 | Tieken |
| 8,833,644 B2 | 9/2014 | Randazza et al. |
| 9,942,217 B2 | 4/2018 | Gulledge |
| 10,015,147 B2 | 7/2018 | Narayan et al. |
| 11,106,515 B1 * | 8/2021 | Fakhraie ............ G06Q 20/4014 |
| 2008/0116268 A1 | 5/2008 | Swift et al. |
| 2008/0243701 A1 | 10/2008 | von Mueller |
| 2009/0057396 A1 | 3/2009 | Barbour et al. |
| 2013/0185206 A1 | 7/2013 | Leggett et al. |
| 2014/0052621 A1 | 2/2014 | Love |
| 2014/0351142 A1 | 11/2014 | Royyuru |
| 2015/0112871 A1 * | 4/2015 | Kumnick ............ G06Q 20/382 705/67 |
| 2016/0019536 A1 * | 1/2016 | Ortiz ............ G06Q 20/36 705/67 |
| 2017/0300961 A1 | 10/2017 | Khvostov et al. |
| 2017/0316479 A1 * | 11/2017 | Kurian ............ G06Q 10/0833 |
| 2017/0364878 A1 * | 12/2017 | Malhotra ............ G06Q 20/401 |
| 2018/0060865 A1 | 3/2018 | Dean et al. |
| 2020/0097928 A1 * | 3/2020 | Dresner ............ G06Q 20/023 |

OTHER PUBLICATIONS

PCT International Search Report and Written Opinion, Application No. PCT/US2021/055489, dated Feb. 16, 2022, 9 pps.

* cited by examiner

MULTI-NETWORK TOKENIZATION SYSTEMS AND METHODS

BACKGROUND

The field of the present disclosure relates generally to multi-network tokenization systems and methods, and more specifically, to systems and methods for electronically generating and managing a token configured to be used across multiple computer networks.

In the computer industry, information is oftentimes shared across multiple networks for a variety of reasons. For example, one computer network may receive and process certain data, then provide at least a portion of that data to a second computer network for further processing. In some instances, data transferred across multiple networks may include confidential data and/or personally identifiable information (PII). In those instances, confidential data and/or PII may be anonymized and/or tokenized to protect the data. However, different networks oftentimes have different protocols and process different types of data. Thus, tokenized data used on a first network may not be recognized when processed over a second network.

The payment industry is an example industry wherein multiple computer networks process data. For example, in the payment industry multiple computer networks may be used when processing check transactions, credit and debit card transactions, store card transactions, etc. When a cardholder pays for a good and/or service by setting up recurring payments with a merchant, the merchant will sometimes require a checking account/bank account identifier be provided, including an account number and/or routing number, for payment purposes instead of keeping a payment card number on file. In these cases, the merchant has direct access to the customer's bank account. Many customers prefer not to provide a bank account identifier to a merchant for a variety of reasons. For example, providing a bank account identifier to many different merchants may result in unwanted payments being charged to the bank account. Many customers also generally prefer to keep bank account identifiers private. When a customer is required to give a merchant their bank account identifier in order to set up recurring payments, the customer essentially relinquishes control of payments to the merchant.

Accordingly, systems and methods are needed wherein a customer can provide an identifier to a merchant that resembles and is linked to a bank account identifier, but is not the actual bank account identifier itself. Thus, a merchant is able to charge payments to a customer bank account, but the customer does not have to provide their bank account identifier to the merchant.

BRIEF DESCRIPTION

In one aspect, a computing system for electronically managing a token across multiple computer networks is described. The computing system includes at least one processor in communication with at least one memory device. The processor is programmed to generate a token associated with a payment account, the token having a format that simulates a format of a checking account identifier, the token provided to a user associated with the payment account and receive a payment request including the token, the payment request associated with a payment transaction initiated by the user with a merchant and processed over a first network. The processor is also programmed to apply a set of rules to the payment request wherein the set of rules is stored in the at least one memory device and associated with the token, determine that the payment request satisfies the set of rules, and convert the token into a payment account identifier using the set of rules, the payment account identifier associated with the payment account. The processor is further programmed to transmit an authorization request message to a second network wherein the second network is different from the first network, the authorization request message including the payment account identifier, receive authorization of the authorization request message from the second network, and provide authorization of the payment request to the first network.

In another aspect, a method for using a computing system to electronically manage a token across multiple computer networks is described. The computing system includes at least one processor in communication with at least one memory device. The method includes generating a token associated with a payment account, the token having a format that simulates a format of a checking account identifier, the token provided to a user associated with the payment account and receiving a payment request including the token, the payment request associated with a payment transaction initiated by the user with a merchant and processed over a first network. The method also includes applying a set of rules to the payment request wherein the set of rules is stored in the at least one memory device and associated with the token, determining that the payment request satisfies the set of rules, and converting the token into a payment account identifier using the set of rules, the payment account identifier associated with the payment account. The method further includes transmitting an authorization request message to a second network wherein the second network is different from the first network, the authorization request message including the payment account identifier, receiving authorization of the authorization request message from the second network, and providing authorization of the payment request to the first network.

In yet another aspect, at least one non-transitory computer-readable media having computer-executable instructions thereon for electronically managing a token across multiple computer networks using a computing system including at least one processor in communication with at least one memory device is described. The computer executable instructions, when executed by the at least one processor, cause the at least one processor to generate a token associated with a payment account, the token having a format that simulates a format of a checking account identifier, the token provided to a user associated with the payment account and receive a payment request including the token, the payment request associated with a payment transaction initiated by the user with a merchant and processed over a first network. The computer executable instructions also cause the processor to apply a set of rules to the payment request wherein the set of rules is stored in the at least one memory device and associated with the token, determine that the payment request satisfies the set of rules, and convert the token into a payment account identifier using the set of rules, the payment account identifier associated with the payment account. The computer executable instructions further cause the processor to transmit an authorization request message to a second network wherein the second network is different from the first network, the authorization request message including the payment account identifier, receive authorization of the authorization request message from the second network, and provide authorization of the payment request to the first network.

BRIEF DESCRIPTION OF THE DRAWINGS

FIG. 1 is a schematic diagram illustrating an example multi-network tokenization (MNT) computing system that includes a MNT computing device for providing a token linked to a bank account as described herein.

FIG. 2 is a schematic of a check that may be used in a financial transaction utilizing the MNT computing system shown in FIG. 1.

FIG. 3 is a schematic diagram illustrating generating and managing a token via the MNT computing system shown in FIG. 1.

FIG. 4 illustrates an example data flow diagram illustrating generating and managing a token using the MNT computing system shown in FIG. 1.

FIG. 5 illustrates an example configuration of a user computing device shown in FIG. 1, in accordance with some embodiments of the present disclosure.

FIG. 6 illustrates an example configuration of server components for generating and managing a token using the MNT computing system shown in FIG. 1.

FIG. 7 is a flow chart of an example process for generating and managing a token via the MNT computing system shown in FIG. 1.

FIG. 8 is a diagram of components of one or more example computing devices that may be used in the MNT computing system shown in FIG. 1.

The following detailed description of the embodiments of the disclosure refers to the accompanying drawings. The same reference numbers in different drawings may identify the same or similar elements.

DETAILED DESCRIPTION

Figure 1:
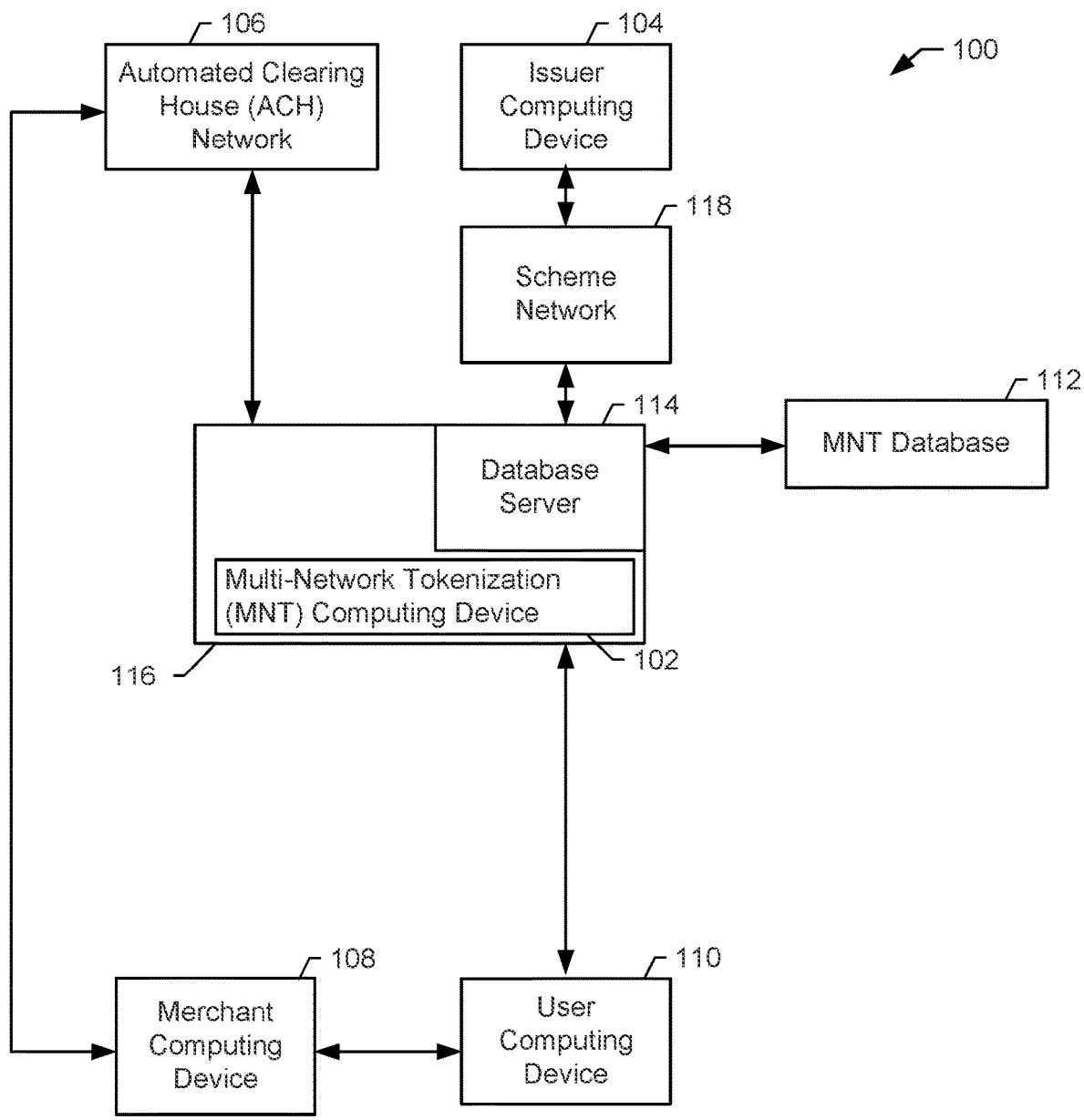
FIGS. 1-8 show example embodiments of the methods and systems described herein.

The systems and methods described herein are configured to electronically generate and manage tokens across a plurality of networks. For example, a multi-network tokenization (MNT) computing system is described. The MNT computing system includes at least one MNT computing device configured to generate tokens that resemble checking/bank account identifiers and are linked to payment card accounts. The tokens generated by the MNT computing device are configured to resemble and be used in place of an actual checking or bank account number such that these tokens can be processed over a check processing network (e.g., a first network), but are linked to an credit or debit account number such that they can be converted and processed over a payment card processing network (e.g., a second network). In some embodiments, the tokens may be linked to a bank account with no credit or debit account number associated therewith.

In the example embodiment, issuer banks can elect to participate in the MNT service associated with the MNT computing system as described herein. Once the issuer bank elects to participate in the MNT service, cardholders of the issuer bank can log in to, as an example, the issuer bank website, access their payment account, and request a token from the MNT computing device. The MNT computing device is configured to, upon receipt of the request, generate a token linked to the payment account (e.g., in some cases this payment account may also be linked to a credit or debit card). The token generated by the MNT computing device includes a token routing number and a token account number, different from, but linked to (e.g., in a memory device accessible by the MNT computing device) an actual payment account identifier that includes the routing number and account number of the actual payment account. Accordingly, when a cardholder is asked by a merchant to provide a bank account number and routing number (e.g., to set up recurring payments) the cardholder can instead provide to the merchant the token that includes the token routing number (which indicates that the payment transaction should be routed to the MNT computing device) and token account number. Thus, the cardholder can take comfort in knowing they did not have to give the actual bank routing number and actual bank account number of their payment account to the merchant.

Upon providing the token to the merchant, the merchant can receive payment via the payment account by following a normal transaction process while the MNT computing device facilitates processing of the transaction in the background. In the example embodiment, each token routing number is exclusive to the MNT computing system. Accordingly, all payment requests including the token routing numbers will be redirected (e.g., by an automated clearing house (ACH)) to the MNT computing device. Upon receipt of the payment request, the MNT computing device is configured to translate the token routing number and token account number to the account number and routing number of the actual payment account (e.g., by utilizing data stored in an MNT database as described herein). The MNT computing device then transmits a translated payment request, now including the account number and routing number of the actual payment account, to an issuer computing device of the issuing bank as an authorization request. Thus, the system described herein provides additional security to the payment transaction. The authorization request, or any other message described herein, may be in ISO 8583 or ISO 20022 message formats for processing over a dedicated payment processing network. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

The issuing bank can then approve the authorization request (e.g., in an authorization message), and transmit the approval to the MNT computing device. Upon receipt of the authorization message from the issuer computing device, the MNT computing device translates the routing number and account number of the actual payment account back to the token routing number and token account number, and transmits a modified approval message (e.g., in some embodiments via the ACH) back to the merchant computing device of the merchant. Thus, the MNT computing device is configured to translate messages including token data (e.g., a token routing number and token routing number) to messages for use in a network where the token data is not useful (e.g., a payment scheme network wherein an actual account identifier is required), and vice versa.

In some embodiments, a set of rules may be stored in the MNT database. Accordingly, upon receipt of a payment request, the MNT computing device may be configured to analyze the payment request against at least a portion of the set of rules. The rules may be configured to help control cardholder spending and otherwise protect against fraudulent transactions. For example, the set of rules may include rules regarding a payment amount of a payment request and/or payment frequency of payment requests. As an example, if a cardholder is charged $50 per month for a gym membership using the MNT computing system and such a rule is set for the customer's account, when the MNT computing device receives a payment request from the gym for the cardholder, the MNT computing device is configured to retrieve the set of rules from the MNT database to confirm that the request complies with the stored rules (e.g., is for $50 and has not been charged within the past month). In some embodiments, the MNT computing device can access a transaction database including transaction histories for particular cardholders to analyze payment requests when applying the set of rules (e.g., access to previous transactions may be necessary to analyze frequency of transactions).

In some embodiments, a separate token may be generated and managed for each merchant used by a cardholder. For example, a cardholder may have one token to use for all merchants, or a token for each merchant they initiate a transaction with. In other words, a cardholder may request and receive a separate token to use with, as examples, a gym, an internet service provider, a utility company, etc. In some embodiments, a separate set of rules may be stored in the MNT database for each token and in turn each merchant. Continuing the example described above, a different set of rules would be stored in the database for the token the cardholder uses with the gym, the token the cardholder uses with the internet service provider, and the token the cardholder uses with the utility company. In some embodiments, the MNT computing device may receive at least a portion of the set of rules from a user computing device of a cardholder. In other words, cardholders may be able to define or set their own rules to be applied in different transactions involving the MNT computing system. In some embodiments, the MNT computing device may generate at least a portion of the set of rules and/or receive at least a portion of the set of rules from another source (e.g., an issuing bank). In some embodiments, the MNT computing device may generate at least a portion of the rules based on analyzing transaction history of a merchant and/or cardholder and a merchant category (e.g., which goods and/or services are provided by the merchant), as examples.

Although an example embodiment described herein includes a token being generated that includes a token routing number and a token account number, different from, but linked to a routing number and account number of an actual payment account, it should be appreciated that different embodiments are envisioned. For example, in some embodiments the token may be linked directly to a bank payment account that is not linked to a payment card (e.g., an account not used for debit and/or credit transactions), and is different from an actual payment account that includes a credit/debit card. In these embodiments, as an example, the MNT computing device may route messages directly to an issuing bank and not through the payment scheme network (or interchange network), because the payment scheme network is configured to process payment card transactions. Further, "cardholder" as described herein, may refer to any user with an account with a card provider and/or at a bank, such as an issuing bank, whether a "card" (e.g., credit card, debit card, etc.) is associated with the account or not.

At least one of the technical problems solved by the present disclosure includes: (i) protecting confidential bank account information that may be required to pay merchants by providing secure tokens that may be processed over multiple networks; (ii) inability of cardholders to remove confidential data from merchant computing devices/networks once the confidential data is provided; (iii) inability of multiple networks to process tokenized data; (iv) inability of payment industry networks to apply rules to tokenized data; (v) inability of payment industry networks to translate tokenized data for use in different payment processing networks.

At least one of the technical benefits of the present disclosure includes: (i) customers are not required to provide confidential bank account information to merchants when merchants request such information for payment; (ii) ability of cardholders to persistently keep confidential data from merchant computing devices/networks; (iii) ability of multiple networks to process tokenized data; (iv) ability to translate a payment transaction from a first network protocol to a second network protocol wherein payment transactions processed over the second network are more secure than payment transactions processed over the first network; (v) ability to translate tokenized data for use in different payment industry networks; (vi) providing a system including a computing device that generates a token to secure payment transactions across at least two separate networks; (vii) ability of a centralized computing device, uniquely positioned between two networks, to receive a token being used for a payment transaction processed over a first network, and to translate the token into an authorization request including a message with an actual payment account identifier wherein the authorization request is processed over a second network; and (viii) ability of a centralized computing device to generate and apply rules to payment transactions being processed over a first network.

The methods and systems described herein may be implemented using computer programming or engineering techniques including computer software, firmware, hardware, or any combination or subset wherein a technical effect of the systems and processes described herein is achieved by performing at least one of the following steps: (i) generating a token associated with a payment account, the token having a format that simulates a format of a checking account identifier, the token provided to a user associated with the payment account; (ii) receiving a payment request including the token, the payment request associated with a payment transaction initiated by the user with a merchant and processed over a first network, the first network configured to process check transactions; (iii) applying a set of rules to the payment request, wherein the set of rules is stored in the at least one memory device and associated with the token; (iv) determining that the payment request satisfies the set of rules; (v) converting the token into a payment account identifier using the set of rules, the payment account identifier associated with the payment account; (vi) transmitting an authorization request to a second network, the authorization request including the payment account identifier; (vii) receiving authorization of the authorization request from the second network; and (viii) providing authorization of the payment request to the first network.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to multi-network tokenization systems and methods.

FIG. 1 is a schematic diagram illustrating an example multi-network tokenization (MNT) computing system 100 for managing tokens linked to a payment account and resembling a checking account identifier. MNT computing system 100 includes at least one MNT computing device 102 in communication with at least one issuer computing device 104, in some embodiments via a scheme network 118, at least one automated clearing house (ACH) network 106, at least one merchant computing device 108, and at least one user computing device 110. MNT computing device 102 is further in communication with at least one MNT database 112. A database server 114 may be in communication with at least one database, such as MNT database 112, that may store and/or process data. MNT computing device 102 may include database server 114 that facilitates communication between MNT computing device 102 and MNT database 112. In some embodiments, MNT database 112 may be stored on an MNT server 116 and may be accessed by logging on to MNT computing device 102 through, for example, user computing device 110. In an alternative embodiment, MNT database 112 is stored remotely from server 116 and may be non-centralized.

In the example embodiment, issuer computing device 104 is associated with an issuing bank of an actual payment account ("payment account") associated with a cardholder at user computing device 110. The payment account is, for example, associated with a payment account identifier, including an account number and a routing number. The issuing bank, at issuer computing device 104, may authorize payments related to one-time transactions and/or recurring payments as described herein. In examples including recurring payments, a purchase price associated with a purchase will be paid over a series of installment payments, each installment payment made in response to a respective payment request from the merchant according to an installment plan established between the merchant and the cardholder at the time of purchase. In some embodiments, issuer computing device 104 may receive messages from MNT computing device 102 via scheme network 118. Scheme network 118 may be, as an example, a network associated with an acquiring bank (e.g., a bank associated with a merchant in a transaction). Generally, scheme network 118 is a network configured to process payment card transactions (e.g., credit card and/or debit card transaction). Accordingly, MNT computing device 102 transmitting messages to issuer computing device 104 via scheme network 118 provides cardholders with the benefits provided by scheme network 118 when processing payment card transactions (e.g., fraud detection, payment disputes, security features, etc.).

ACH network 106 may be used for processing of a check and/or processing of a transaction via a checking account. One example of an automated clearing house is the National Automated Clearing House Association (NACHA). ACH network 106 sorts all received checks/transactions according to an issuing bank (e.g., at issuer computing device 104), which is a bank at which a cardholder at user computing device 110 holds an account. In the case of paper checks, ACH network 106 also scans each check to generate an electronic image and electronically transmits the electronic images to a Federal Reserve Bank. ACH network 106 also sends the paper checks to the issuing bank associated with the account on which the check was drawn. The Federal Reserve Bank receives the electronically transmitted check images from ACH network 106 and, in turn, electronically transmits the images to the issuer computing device 104 associated with the issuing bank associated with each check/transaction. Thus, generally, ACH network 106 is configured to process check transactions.

In the example embodiment, merchant computing device 108 is a computing device of a merchant at which purchases/installment plans are made. Merchant computing device 108 is configured to generate payment requests associated with transactions, including installment/recurring payment requests. In some embodiments, merchant computing device 108 is configured to transmit payment requests to ACH network 106.

In the example embodiment, user computing device 110 (e.g., a smartphone, laptop, tablet, etc.) is configured to receive user inputs from a user thereof (e.g., a cardholder) regarding requested tokens, as an example. User computing device 110 is further configured to generate and transmit, to MNT computing device 102, a message indicating a cardholder request to generate a token. In some embodiments, a cardholder at user computing device 110 can manage previously generated tokens (e.g., by editing and/or deleting tokens, or data associated therewith such as different names and/or labels associated with the tokens).

Figure 2:
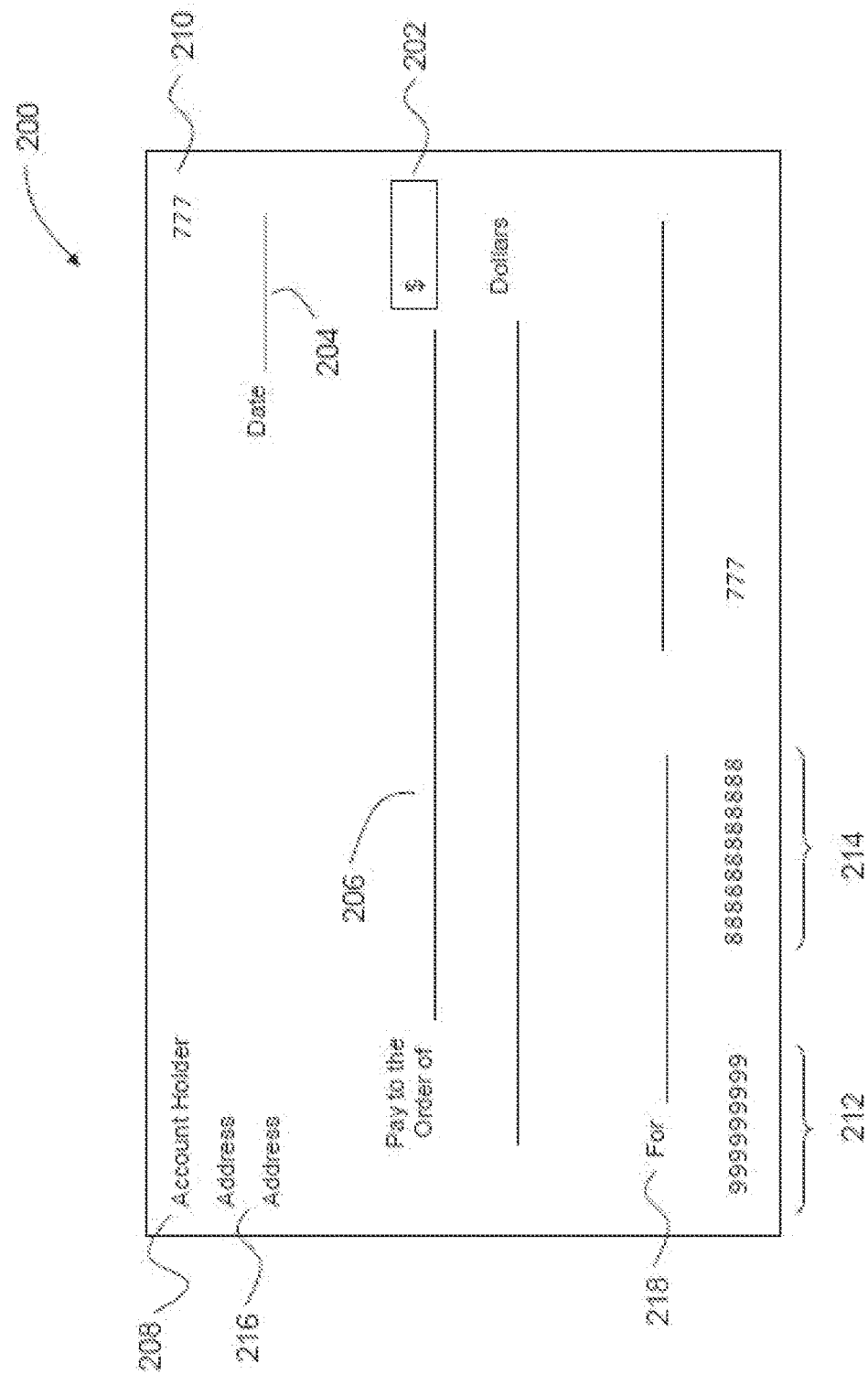

FIG. 2 is a schematic of a typical check 200 that may be used in a financial transaction, such as the transaction facilitated by MNT system 100 described in FIG. 1. Check 200 includes data relating to the transaction and data relating to the actual account on which check 200 is drawn. Transaction-related data includes, for example, a transaction amount 202, a transaction date 204, and a payee field 206. Account-related data includes, for example, an account holder's name 208, a check number 210, an issuing bank routing number 212, and an account number 214 (e.g., account-related data may be included in a payment account identifier, as described herein). Routing number 212 and account number 214 may be applied to check 200 using magnetic ink such that a Magnetic Ink Character Recognition (MICR) reader is enabled to read numbers 212 and 214. Further check 200 also includes an address field 216, which contains the address of the account holder, and a memo field 218 for notes from the account holder.

In some embodiments, check 200 may not include account holder's name 208, routing number 212, account number 214, and/or address field 216. Instead, check 200 may include only a unique identifier that relates to the account holder. The merchant (e.g., at merchant computing device 108 shown in FIG. 1) associated with a financial transaction may scan check 200 and/or enter the unique identifier to receive account holder's name 208, routing number 212, account number 214, address field 216, and/or any other identifying information.

In the example embodiment, MNT computing device 102 is configured to generate a token including a token routing number and a token account number resembling the format of actual routing number 212 and actual account number 214, but different from actual routing number 212 and actual account number 214 so that actual routing number 212 and actual account number 214 are not given to merchants.

Figure 3:
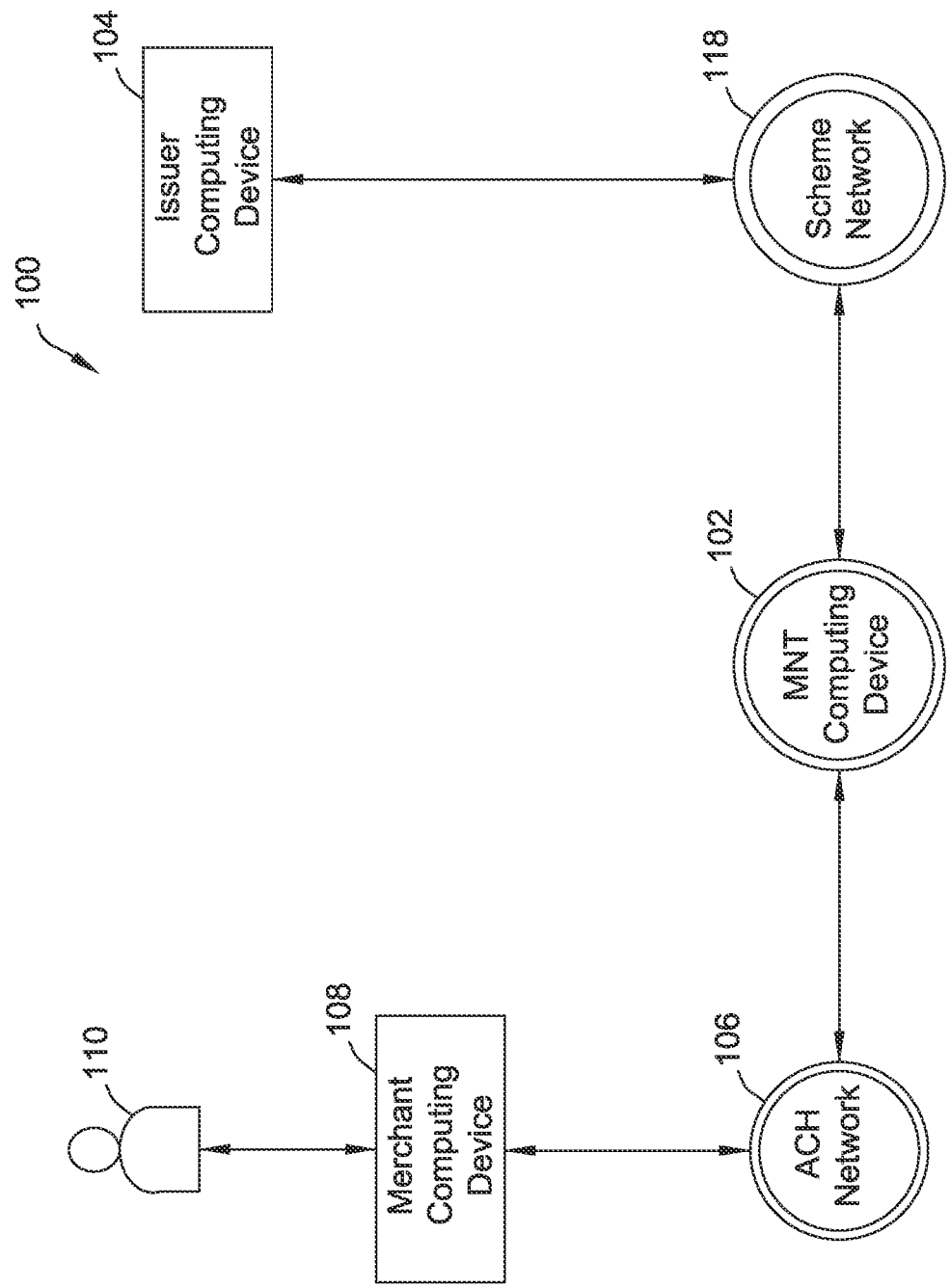

FIG. 3 is a schematic diagram illustrating an example of processing a transaction by utilizing MNT computing system 100 shown in FIG. 1. To approve use of MNT computing device 102 by cardholders, an issuing bank (e.g., at issuer computing device 104) may need to approve of and/or authorize MNT computing device 102. Once an issuing bank has approved use of MNT computing device 102 by their cardholders, a cardholder, for example at user computing device 110, may request a token from MNT computing device 102 via a website and/or mobile application of the issuing bank. MNT computing device then generates and transmits a token to user computing device 110 so that the cardholder can use the token.

The token generated by MNT computing device includes a simulated checking account identifier (of the same format as an actual checking account identifier, but not including the same details as an actual checking account identifier of the actual payment account) and is associated with a payment account of the cardholder. For example, the cardholder has an account at the issuing bank. The account, if the account is a checking account, includes an account identifier including an actual routing number (e.g., routing number 212) and an actual account number (e.g., account number 214). The checking account identifier included in the token includes a simulated/token routing number and a simulated/token account number, wherein the token routing number and token account number are of the same format as the routing number and account number of the payment account, but include different details (e.g., different letters and/or numbers). The token routing number and token account number (e.g., the checking account identifier) are associated with the routing number and account number of the actual payment account (e.g., the payment account identifier), and are stored in MNT database 112 as being associated (e.g., in a lookup table). Thus, when a cardholder provides a token to a merchant, the merchant does not have access to the routing number and account number of the actual payment account, but a transaction can be completed by using the token (e.g., because the transaction is routed through the MNT computing device 102 as described herein).

An example transaction utilizing MNT computing system 100 is shown in FIG. 3. A cardholder at user computing device 110 may present a token generated by MNT computing device 102 to a merchant at merchant computing device 108. Merchant computing device 108 thereby receives the checking account identifier of the token, including a token routing number and a token account number, and, as it would with any checking transaction, transmits the checking account identifier in a payment request to an ACH at ACH network 106. The token routing number and token account number are specific to MNT computing device 102. Accordingly, upon receipt of the checking account identifier of the token, ACH network 106 transmits the payment request including the checking account identifier to MNT computing device 102.

Upon receipt of the payment request, MNT computing device 102 is configured to use a lookup in MNT database 112 to translate the token routing number and token account number to the routing number and account number of the actual payment account at the issuing bank. In some embodiments, MNT computing device 102 may apply a set of rules to the payment request before translating the token routing number and token account number. For example, a set of rules may be stored in MNT database 112 for each token. A set of rules may include, as examples, rules regarding payments amounts, payment frequencies, and merchant categories. Continuing the example described above, a cardholder may have a gym membership wherein the cardholder has provided a token to the gym for use with monthly $50 payments. Accordingly, upon receipt of a payment request from the gym, MNT computing device 102 would look up rules stored in MNT database 112 associated with the token used by the gym. MNT computing device 102 would then apply the rules (e.g., a $50 payment to occur once per month) associated with the token to the payment request. In other words, MNT computing device 102 only translates the token routing number and token account number if the payment request is for no more than $50, and a payment has not been made by the actual payment account associated with the token for $50 to the gym within the past month. In some embodiments, MNT computing device 102 may have access to transaction histories of actual payment accounts (e.g., at MNT database 112, or any other database such as a database associated with scheme network 118) in order to use transaction histories to apply the rules (e.g., to determine another $50 payment was made from the actual payment account to the gym within the past month). In some embodiments, MNT computing device 102 stores each transaction processed by MNT computing device 102 in MNT database 112 (e.g., in order to apply rules in the future). In some embodiments, the payment request may include a merchant identifier, and the set of rules may include a stored merchant identifier. In these embodiments, MNT computing device 102, upon receipt of a payment request, may analyze the merchant identifier in the payment request and the merchant identifier in the set of rules in order to confirm that they are the same merchant identifier (e.g., by comparing the merchant identifier in the payment request and the merchant identifier in the set of rules). In other words, MNT computing device 102 may determine the merchant identifier in the payment request and the merchant identifier in the set of rules match in order to confirm the identity of the merchant (e.g., that the proper merchant is submitting the payment request). If a payment request does not satisfy the set of rules (e.g., a rule is violated), MNT computing device 102 may deny the payment request (e.g., by transmitting a message to merchant computing device 108, in some embodiments via ACH network 106).

If a payment request does satisfy the set of rules (e.g., no rules are violated by the payment request), MNT computing device 102 translates the token routing number and token account number to the routing number and account number of the actual payment account (e.g., a payment account identifier) at the issuing bank. After the translation, MNT computing device 102 is configured to transmit the translated payment request (e.g., an authorization request) including actual payment account details (e.g., in a payment account identifier) to scheme network 118 of the appropriate issuing bank. Scheme network 118 then routes the translated payment request including payment account details to issuer computing device 104 of the appropriate issuing bank.

The issuing bank then determines whether to approve the payment request based on payment account details at the issuing bank (e.g., an account balance, etc.) and, upon approval of the payment request, issuer computing device 104 transmits an approval message (e.g., including payment account details and a merchant payment) to MNT computing device 102 via scheme network 118. A similar process would occur upon the issuing bank denying a request. MNT computing device 102 then utilizes a lookup in MNT database 112 to convert/translate the actual payment account details back to the checking account identifier of the token (e.g., including the token routing number and token account number). MNT computing device 102 is configured to then transmit the translated approval message (or in the case of denial, a translated denial message) to merchant computing device 110 via ACH network 106.

As can be seen in the example above, MNT computing device 102 is configured to translate messages between a variety of networks in order to process transactions while keeping actual payment account details private (e.g., not providing the actual account details to a merchant). Without MNT computing device 102, and the translations from ACH network 106 (a "first" network) to scheme network 118 (a "second" network) and vice versa, a cardholder would have to give the merchant their actual payment account details (e.g., their payment account identifier). In some embodiments, the first network (e.g., ACH network 106) and the second network (e.g., scheme network 118) may include different protocols such that, without conversion/translation by MNT computing device 102, at least a portion of messages transmitted from the first network to the second network would not be readable. In some embodiments, MNT computing device 102 is configured to translate messages to and from networks other than ACH network 106 and scheme network 118, and any number of networks (e.g., a "third" network, a "fourth" network, etc.).

Figure 4:
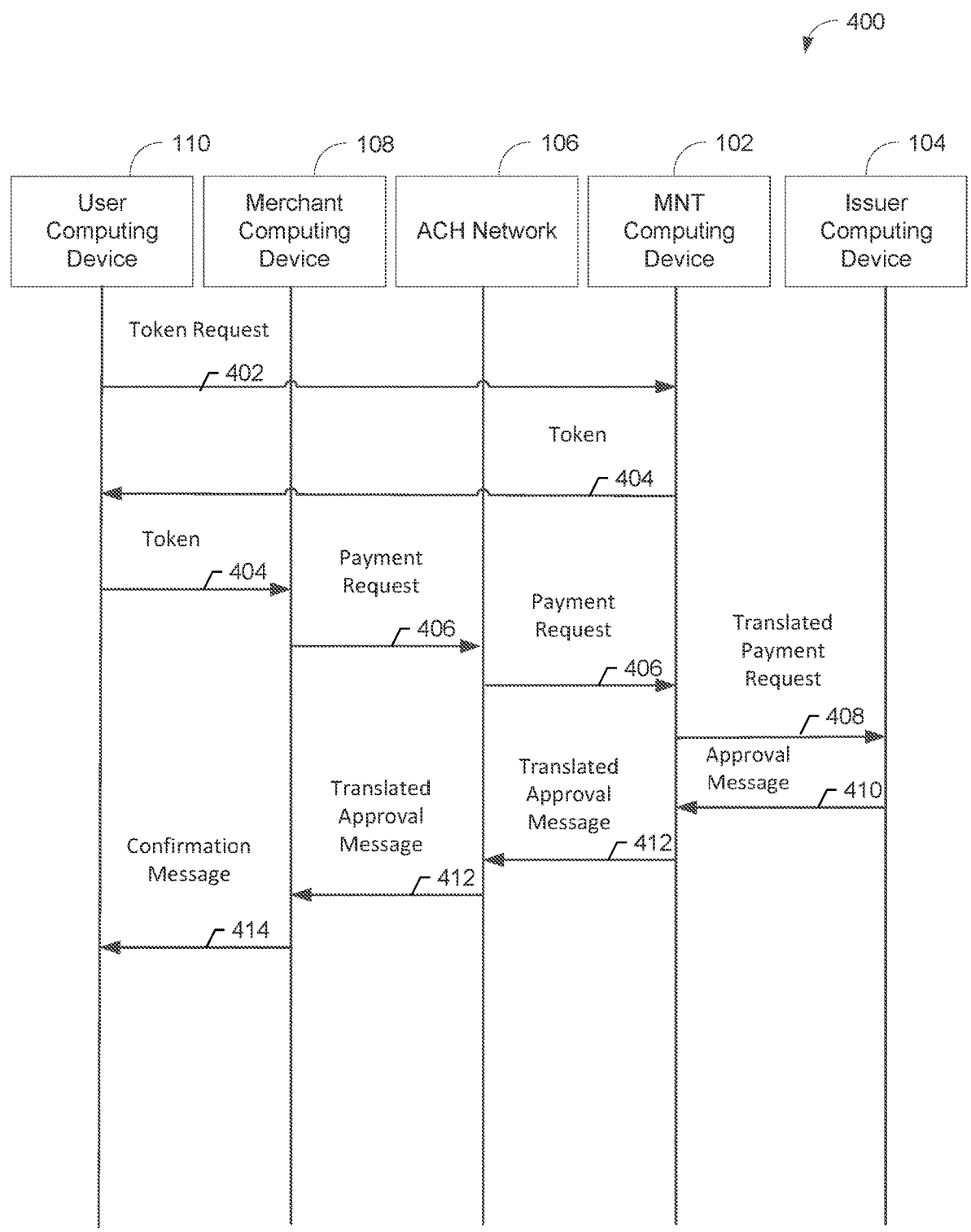

FIG. 4 illustrates an example data flow diagram 400 illustrating generating and managing tokens using MNT computing system 100 shown in FIG. 1. As described herein, upon issuer bank approval, a cardholder may request a token from MNT computing device 102 by transmitting a token request 402, including actual payment account details such as an account number and a routing number, from user computing device 110 to MNT computing device 102. MNT computing device 102 then generates a token 404, including a checking account identifier that includes a token routing number and a token account number different from the actual account number and the actual routing number, but of the same format as the actual account number (e.g., account number 214) and the actual routing number (e.g., routing number 212), and transmits the generated token 404 to user computing device 110. MNT computing device 102 also transmits at least the actual number, the actual routing number, token account number, and token routing number to MNT database 112 for storage. In some embodiments, MNT computing device may also transmit token 404 to issuer computing device 104.

Once the cardholder has access to the token at user computing device 110, the cardholder may provide token 404 to any number of merchants for use with payments (e.g., recurring payments, one-time payments, etc.). In some embodiments, a cardholder may desire to provide a different token 404 to each different merchant they interact with. One particular benefit of providing a different token 404 to each different merchant is that when recurring payments stop at a merchant, and the cardholder no longer wants the merchant to be able to charge their payment account, the cardholder can simply request (e.g., to MNT computing device 102) that the token 404 provided to that specific merchant be canceled. Accordingly, MNT computing device 102 may transmit a message to MNT database 112 (e.g., for storage in a lookup table) that a particular token 404 has been canceled. Thus, when MNT computing device 102 receives a payment request including the canceled token 404, MNT computing device denies the payment request. By providing a different token 404 to each different merchant, the cardholder is able to cancel one token 404 at a time, so that when one token 404 is canceled, other merchants (e.g., merchants still authorized to be paid by the cardholder) do not need to be provided with a new token 404. If a cardholder provides the same token 404 to each merchant, merchants authorized to make payment requests using token 404 would need to be provided with a new token 404 whenever the cardholder decides to cancel the token 404 at any merchant. In some embodiments, a cardholder may be able to view (e.g., at an issuing bank website and/or mobile application) each token 404 associated with their payment account. In some embodiments, the cardholder may be able to label/edit each token 404 so that they know which tokens are associated with which merchants.

In some embodiments, cardholders may be able to define or set their own rules to be applied to different transactions involving MNT system 100 as described herein. Once the cardholder creates a set of rules to be associated with a token 404, the cardholder may transmit the set of rules to MNT computing device 102 via user computing device 110. In some embodiments, MNT computing device 102 may define rules (e.g., based on cardholder transaction activity, a merchant category, etc.). In some embodiments, an issuing bank may define a set of rules and transmit the set of rules to MNT computing device 102 from issuer computing device 104. Upon receiving and/or generating or receiving a set of rules, MNT computing device 102 transmits the set of rules to MNT database 112 for storage.

As described above, a cardholder may transmit a token 404, including token data such as a token routing number and a token account number, to merchant computing device 108 from user computing device 110. When the merchant charges the cardholder for a payment, the merchant transmits a payment request 406, including token 404, from merchant computing device 108 to ACH network 106. ACH network 106 then routes payment request 406 to MNT computing device 102. MNT computing device 102 then analyzes token 404 in payment request 406 to retrieve actual payment account details from a lookup table in MNT database 112. Accordingly, after performing the lookup in MNT database 112, MNT computing device 102 translates the token routing number and token account number in to the routing number and account number of the actual payment account at the issuer bank. MNT computing device 102 then generates a translated payment request 408 (e.g., an authorization request), including the payment account identifier (e.g., the actual routing number and the actual account number) described above, and transmits translated payment request 408 to issuer computing device 104 (e.g., via scheme network 118). The issuing bank may then approve/deny translated payment request 408.

Upon approval of translated payment request 408, issuer computing device 104 generates an approval message 410, including a payment for the merchant and actual payment account details, and transmits approval message 410 to MNT computing device 102 (e.g., via scheme network 118). MNT computing device 102 again performs a lookup in MNT database 112, and translates approval message 410 to a translated approval message 412 including the payment for the merchant and token 404, instead of the actual payment account details. MNT computing device 102 then transmits translated approval message 412 to merchant computing device 108 via ACH network 106. In some embodiments, MNT computing device 102 may transmit translated approval message 412 to an acquiring bank associated with the merchant. In some embodiments, merchant computing device 108, or another computing device such as MNT computing device 102, is configured to transmit a confirmation message 414 to user computing device 110. Confirmation message 414 may include, as examples, confirmation of authorization of the transaction by the issuing bank and receipt of payment by the merchant and/or acquiring bank.

Figure 5:
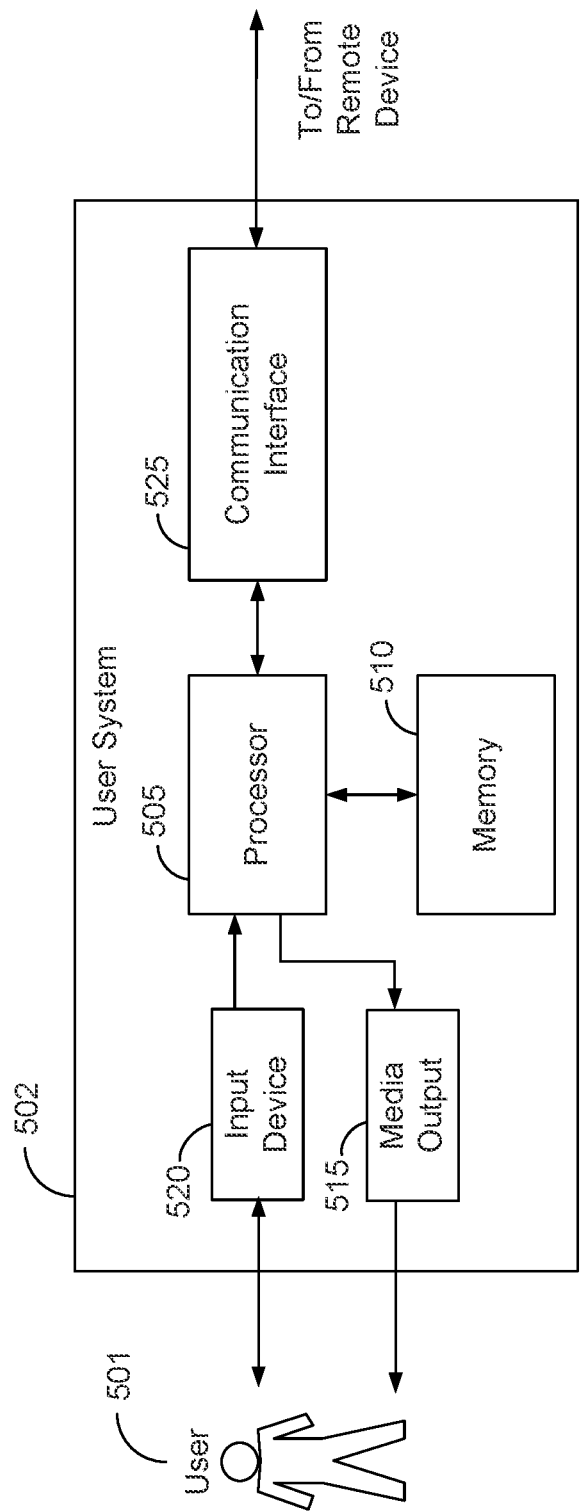

FIG. 5 illustrates an example configuration of a user system 502 operated by a user 501. In the example embodiment, user system 502 is similar to user computing device 110 and/or merchant computing device 108 (both shown in FIG. 1), and may be used by user 501 to interact with MNT computing device 102 (also shown in FIG. 1). More specifically, user system 502 may be used to access an MNT service provided by MNT computing device 102, to generate and manage tokens as described herein. In the example embodiment, user system 502 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

User system 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device, a liquid crystal display (LCD), organic light emitting diode (OLED) display, or "electronic ink" display, or an audio output device, a speaker or headphones.

In some embodiments, user system 502 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. User system 502 may also include a communication interface 525, which is communicatively couplable to a remote device, such as MNT computing device 102. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from MNT computing system 100. A client application allows user 501 to interact with a server application from MNT computing system 100, such as the MNT service.

Figure 6:
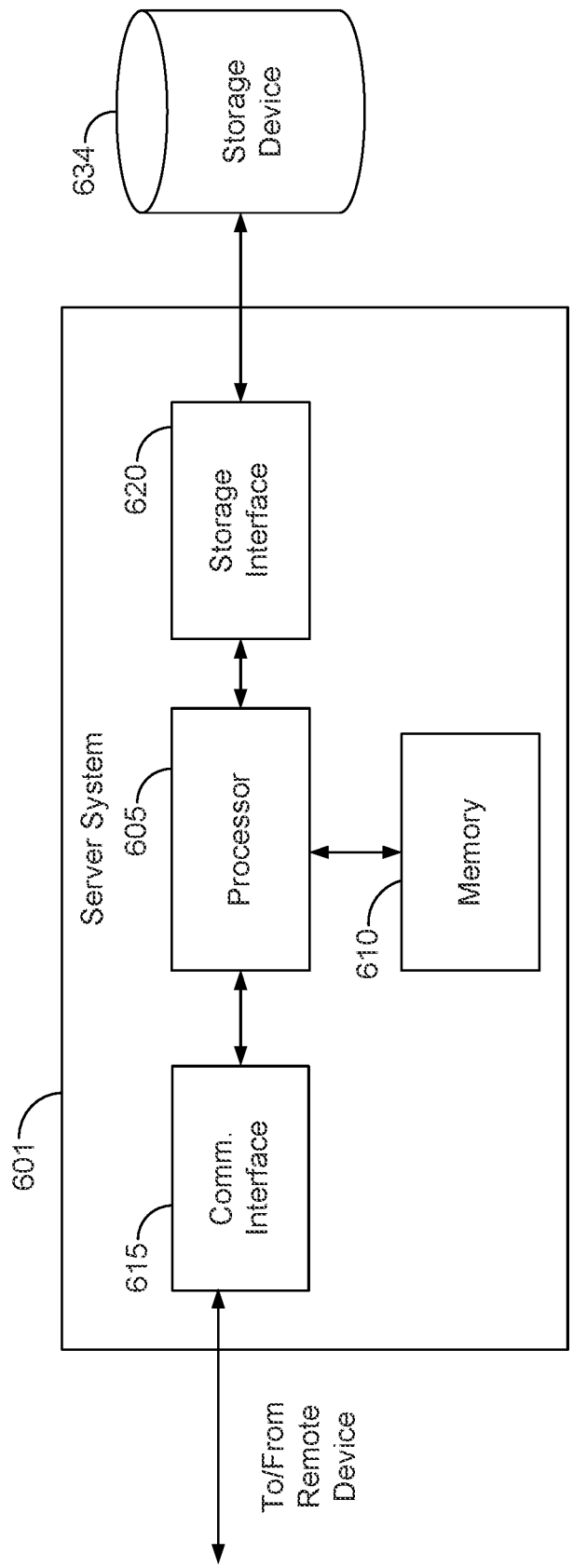

FIG. 6 illustrates an example configuration of a server system 601. Server system 601 may include, but is not limited to, MNT computing device 102 (shown in FIG. 1). Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on server system 601, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 605 is operatively coupled to a communication interface 615 such that server system 601 is capable of communicating with a remote device such as user system 502 (shown in FIG. 5) or another server system 601. For example, communication interface 615 may receive requests from user computing device 110 via the Internet.

Processor 605 may also be operatively coupled to a storage device 634. Storage device 634 is any computer-operated hardware suitable for storing and/or retrieving data. In some embodiments, storage device 634 is integrated in server system 601. For example, server system 601 may include one or more hard disk drives as storage device 634. In other embodiments, storage device 634 is external to server system 601 and may be accessed by a plurality of server systems 601. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
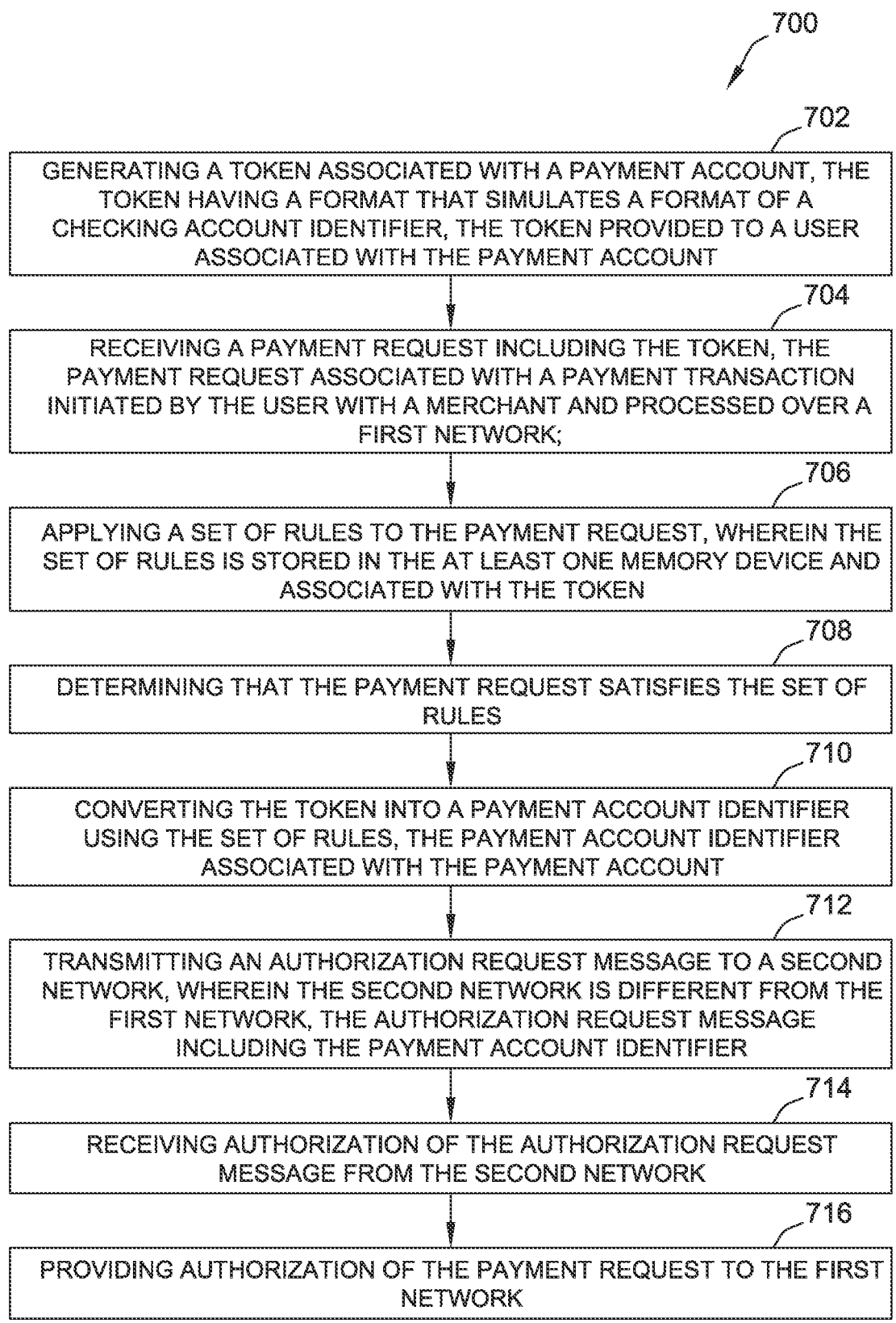

FIG. 7 is a flow chart of an example method 700 for generating and managing a token via MNT computing system 100 shown in FIG. 1. Method 700 includes generating 702 a token (e.g., token 404) associated with a payment account, the token having a format that simulates a format of a checking account identifier, the token provided to a user associated with the payment account and receiving 704 a payment request (e.g., payment request 406) including the token, the payment request associated with a payment transaction initiated by the user with a merchant and processed over a first network (e.g., ACH network 106), the first network configured to process check transactions. Method 700 also includes applying 706 a set of rules to the payment request, wherein the set of rules is stored in the at least one memory device (e.g., MNT database 112) and associated with the token, determining 708 that the payment request satisfies the set of rules, and converting 710 the token into a payment account identifier using the set of rules, the payment account identifier associated with the payment account. Method 700 further includes transmitting 712 an authorization request (e.g., translated payment request 408) to a second network (e.g., scheme network 118) wherein the second network is different from the first network, the authorization request including the payment account identifier, receiving 714 authorization of the authorization request from the second network, and providing 716 authorization of the payment request to the first network.

Figure 8:
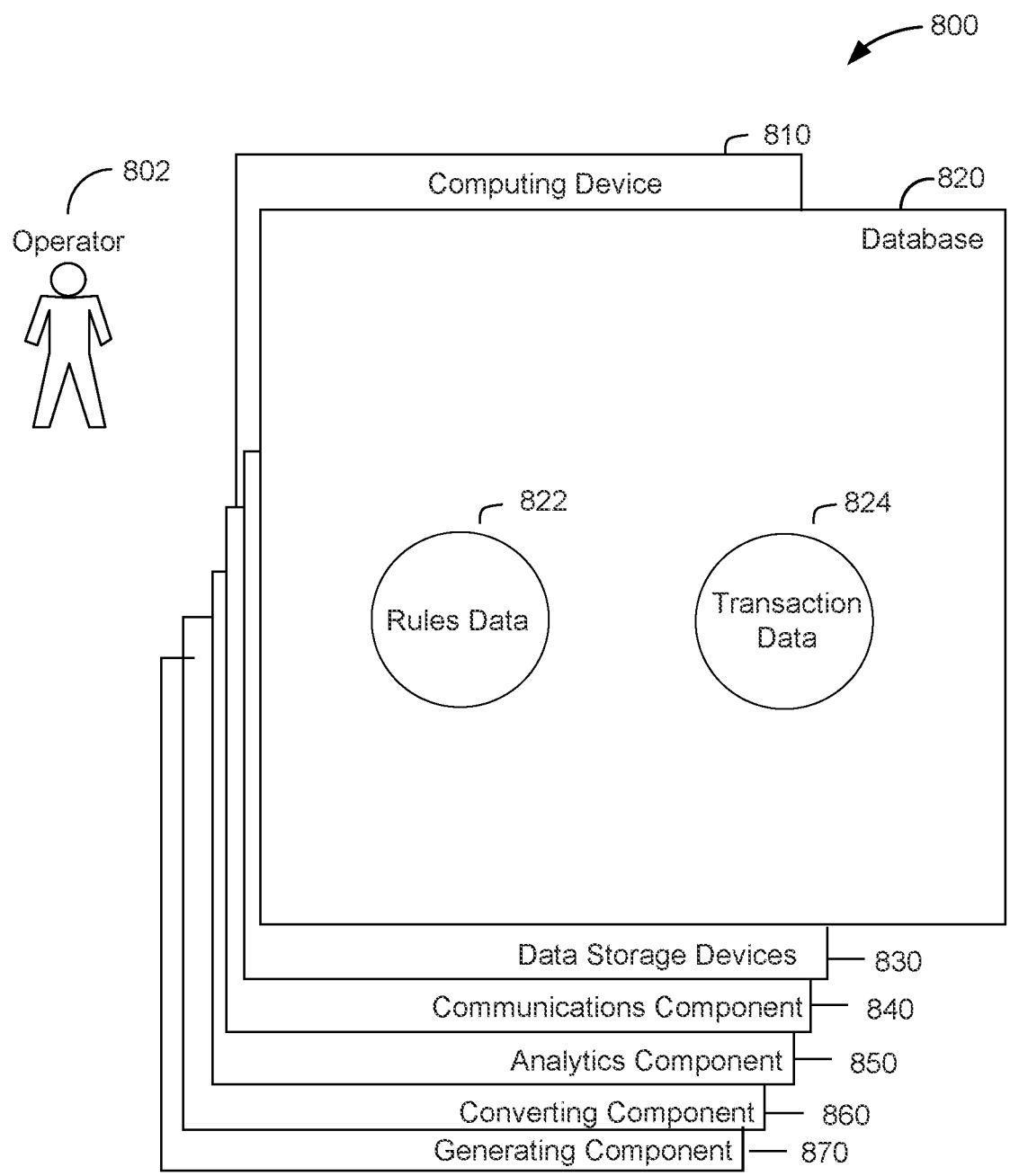

FIG. 8 is a diagram of components of one or more example computing devices 810 (e.g., MNT computing device 102) that may be used in MNT computing system 100 in FIG. 1. Computing device 810 includes database 820 as well as data storage devices 830, a communication component 840, and an analytics component. Database 820 may store information such as, for example, rules data 822 (e.g., including a set of rules as described herein) and transaction data 824 (e.g., of previous transactions/transaction histories for use by MNT computing device 102 when applying a set of rules). Database 820 is coupled to several separate components within MNT computing device 102, which perform specific tasks.

Communication component 840 facilitates communication between computing device 810 and other systems. For example, communication component may be used to receive a payment request from a first network, transmit an authorization request to a second network, receive authorization of the authorization request from the second network, and provide authorization of the payment request to the first network. Analytics component 850 is used to analyze data as described herein. For example, analytics component 850 may be used to apply a set of rules to a payment request and determine whether the payment request satisfies the set of rules. Converting component 860 is used to, as examples, convert/translate a token into a payment account identifier, and vice versa. Generating component 870 is used to, as an example, generate a token as described herein.

The systems and processes are not limited to the specific embodiments described herein. In addition, components of each system and each process can be practiced independent and separate from other components and processes described herein.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing system for electronically managing a token across multiple computer networks, the computing system comprising at least one processor in communication with at least one memory device, the at least one processor programmed to:
    generate a token associated with a payment account and a user, the token having a first format comprising a checking account identifier format, the payment account associated with a payment account identifier comprising a second format different from the checking account identifier format;
    transmit the token to a user computing device associated with the user;
    receive a payment request including the token, the payment request associated with a payment transaction initiated by the user computing device with a merchant computing device associated with a merchant and processed over a first network;
    apply a set of rules to the payment request, wherein the set of rules is stored in the at least one memory device, is associated with the token, and includes a frequency with which payment requests including the token can be authorized;
    determine that the payment request satisfies the set of rules including the frequency;
    convert the token from the first format into the payment account identifier comprising the second format using the set of rules, the payment account identifier associated with the payment account;
    transmit an authorization request message to a second network, wherein the second network is different from the first network, the authorization request message including the payment account identifier;
    receive authorization of the authorization request message from the second network; and
    provide authorization of the payment request to the first network.

2. The computing system of claim 1, wherein the at least one processor is further programmed to generate the token such that the token is specific to the user and the merchant.

3. The computing system of claim 2, wherein the at least one processor is further programmed to compare the token to a merchant identifier of the merchant included in the payment request, such that the identity of the merchant is confirmed by the at least one processor.

4. The computing system of claim 1, wherein the at least one processor is further programmed to apply the set of rules, wherein the set of rules includes at least one of a rule directed to limiting a payment amount requested in the payment request, a rule directed to a payment frequency of payment requests, and a rule directed to a merchant category of the merchant.

5. The computing system of claim 1, wherein the at least one processor is further programmed to receive, from a user computing device, at least a portion of the set of rules such that the user defines the portion of the set of rules at the user computing device.

6. The computing system of claim 1, wherein the at least one processor is further programmed to convert the token from a network protocol of the first network to a network protocol of the second network, wherein the network protocol of the first network is different from the network protocol of the second network.

7. The computing system of claim 1, wherein the first network is an automated clearing house (ACH) network configured to process check transactions and the second network is configured to process payment card transactions.

8. The computing system of claim 1, wherein the at least one processor is further programmed to identify the set of rules from a plurality of sets of rules stored in the at least one memory device based on the token, wherein the plurality of sets of rules are associated with the user, and wherein a number of the plurality of sets of rules are associated with respective merchants and include at least one of a respective frequency or a respective payment amount.

9. A method for using a computing system to electronically manage a token across multiple computer networks, the computing system including at least one processor in communication with at least one memory device, said method comprising:
    generating a token associated with a payment account and a user, the token having a first format comprising a checking account identifier format, the payment account associated with a payment account identifier comprising a second format different from the checking account identifier format;
    transmitting the token to a user computing device associated with the user;
    receiving a payment request including the token, the payment request associated with a payment transaction initiated by the user computing device with a merchant computing device associated with a merchant and processed over a first network;
    applying a set of rules to the payment request, wherein the set of rules is stored in the at least one memory device, is associated with the token, and includes a frequency with which payment requests including the token can be authorized;
    determining that the payment request satisfies the set of rules including the frequency;
    converting the token from the first format into the payment account identifier comprising the second format using the set of rules, the payment account identifier associated with the payment account;
    transmitting an authorization request message to a second network, wherein the second network is different from the first network, the authorization request message including the payment account identifier;

receiving authorization of the authorization request message from the second network; and providing authorization of the payment request to the first network.

10. The method of claim 9, further comprising generating the token such that the token is specific to the user and the merchant.

11. The method of claim 10, further comprising comparing the token to a merchant identifier of the merchant included in the payment request, such that the identity of the merchant is confirmed by the at least one processor.

12. The method of claim 9, further comprising applying the set of rules, wherein the set of rules includes at least one of a rule directed to limiting a payment amount requested in the payment request, a rule directed to a payment frequency of payment requests, and a rule directed to a merchant category of the merchant.

13. The method of claim 9, further comprising receiving, from a user computing device, at least a portion of the set of rules such that the user defines the portion of the set of rules at the user computing device.

14. The method of claim 9, further comprising converting the token from a network protocol of the first network to a network protocol of the second network, wherein the network protocol of the first network is different from the network protocol of the second network.

15. The method of claim 9, further wherein the first network is configured to process check transactions and the second network is configured to process payment card transactions.

16. At least one non-transitory computer-readable media having computer-executable instructions thereon for electronically managing a token across multiple computer networks, using a computing system including at least one processor in communication with at least one memory device, wherein the computer executable instructions, when executed by the at least one processor, cause the at least one processor to:

generate a token associated with a payment account and a user, the token having a first format comprising a checking account identifier format, the payment account associated with a payment account identifier comprising a second format different from the checking account identifier format;

transmit the token to a user computing device associated with the user;

receive a payment request including the token, the payment request associated with a payment transaction initiated by the user computing device with a merchant computing device associated with a merchant and processed over a first network;

apply a set of rules to the payment request, wherein the set of rules is stored in the at least one memory device, is associated with the token, and includes a frequency with which payment requests including the token can be authorized;

determine that the payment request satisfies the set of rules including the frequency;

convert the token from the first format into the payment account identifier comprising the second format using the set of rules, the payment account identifier associated with the payment account;

transmit an authorization request message to a second network, wherein the second network is different from the first network, the authorization request message including the payment account identifier;

receive authorization of the authorization request message from the second network; and provide authorization of the payment request to the first network.

17. The computer-readable media of claim 16 further causing the at least one processor to generate the token such that the token is specific to the user and the merchant.

18. The computer-readable media of claim 16 further causing the at least one processor to apply the set of rules, wherein the set of rules includes at least one of a rule directed to limiting a payment amount requested in the payment request, a rule directed to a payment frequency of payment requests, and a rule directed to a merchant category of the merchant.

19. The computer-readable media of claim 16 further causing the at least one processor to receive, from a user computing device, at least a portion of the set of rules such that the user defines the portion of the set of rules at the user computing device.

20. The computer-readable media of claim 16 further causing the at least one processor to convert the token from a network protocol of the first network to a network protocol of the second network, wherein the network protocol of the first network is different from the network protocol of the second network.

* * * * *